Figure 1:
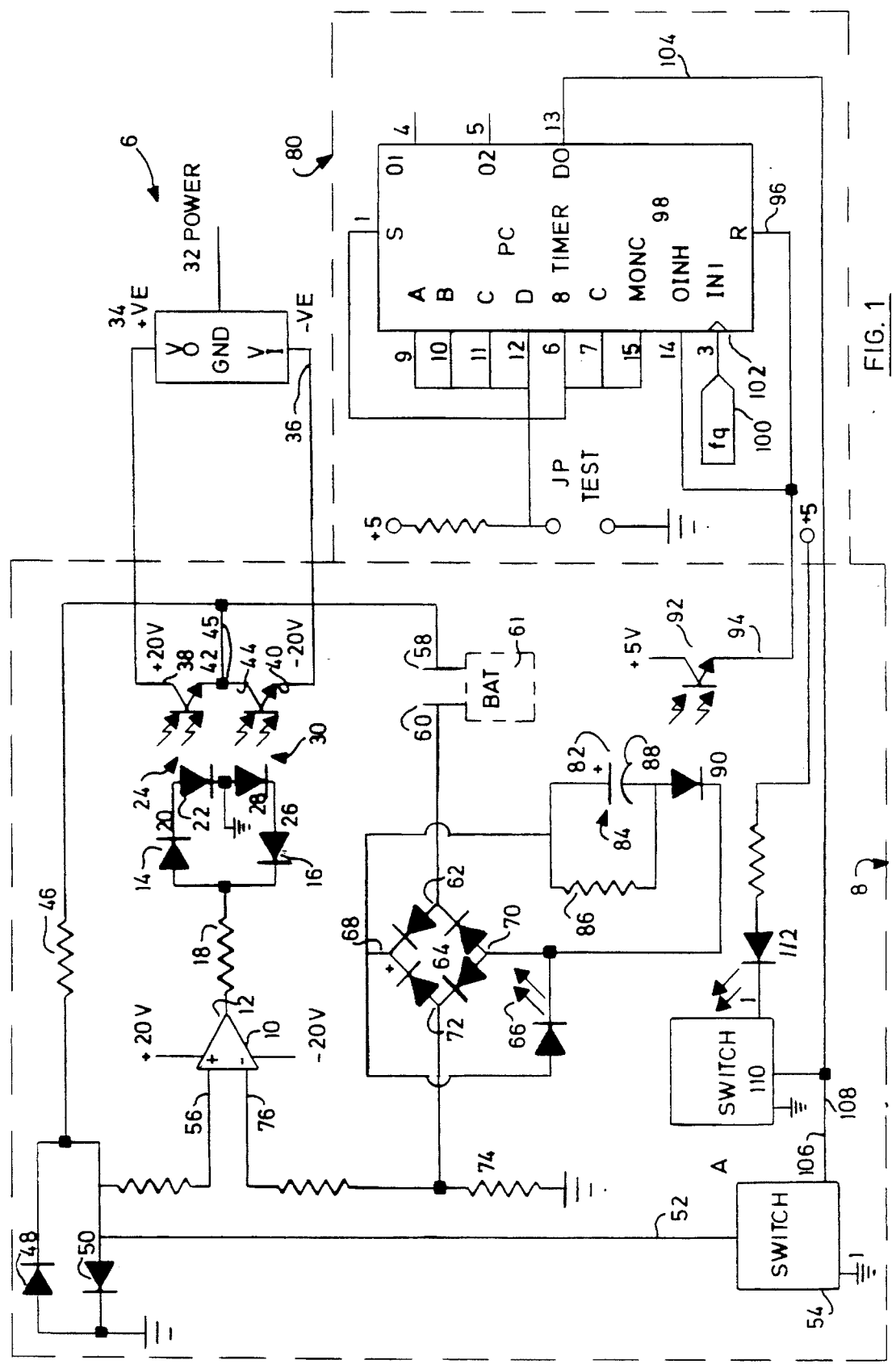

United States Patent [19]
Walborn et al.

[11] Patent Number: 5,486,750
[45] Date of Patent: Jan. 23, 1996

[54] BATTERY CHARGER WITH POLARITY SENSING AND TIMER

[76] Inventors: Laverne A. Walborn, 142 Willow Avenue, Toronto, Ontario; Brian W. H. Wong, 31 Benfrisco Crescent, Scarborough, Ontario, both of Canada

[21] Appl. No.: 177,166

[22] Filed: Jan. 4, 1994

[51] Int. Cl.[6] .................................................. H01M 10/46
[52] U.S. Cl. ............................................ 320/25; 320/26
[58] Field of Search ................................. 320/25, 26, 37, 320/38

[56] References Cited

U.S. PATENT DOCUMENTS

| | | | |
|---|---|---|---|
| 3,609,506 | 9/1971 | Frezzolini et al. | 320/25 X |
| 3,855,516 | 12/1974 | Fairchild | 320/37 X |
| 3,900,783 | 8/1975 | Herzog et al. | 320/25 X |
| 4,198,593 | 4/1980 | Ballman | 320/37 X |
| 4,218,644 | 8/1980 | Bourke et al. | 320/37 X |
| 4,227,141 | 10/1980 | Cross | 320/38 X |
| 4,551,666 | 11/1985 | Wada et al. | 320/38 X |
| 4,562,398 | 12/1985 | Kotlarewsky | 320/38 X |
| 4,571,533 | 2/1986 | Dey | 320/25 |
| 4,694,237 | 9/1987 | Hanson | 320/38 X |
| 4,755,733 | 7/1988 | Laliberte | 320/38 X |
| 4,868,706 | 9/1989 | Zaderej | 320/25 X |
| 4,876,496 | 10/1989 | Duncan | 320/25 X |
| 5,072,167 | 12/1991 | Zias | 320/26 |
| 5,089,762 | 2/1992 | Sloan | 320/38 X |
| 5,103,155 | 4/1992 | Joannou | 320/26 |

FOREIGN PATENT DOCUMENTS

| | | | |
|---|---|---|---|
| 1315224 | 12/1989 | Japan | 320/38 |

OTHER PUBLICATIONS

"An Innovative Battery Charger for Telemetry Systems," *Canadian Medical and Biological Engineering Society Conference Proceedings*, Jun. 8–11, 1992, V. Walborn et al., pp. 1–2.

*Primary Examiner*—Peter S. Wong
*Assistant Examiner*—Edward Tso

[57] ABSTRACT

A battery charge system includes an electronic polarity sensing, a charging circuit and a timer. When a battery to be charged is connected, the polarity sensing circuit automatically recognizes the polarity of the inserted battery and the drive circuit charges the battery with correct polarity current for the required period of time. The charge timing circuit indicates when charging is taking place and when the charge is finished. When the battery is removed and another battery is inserted, the device is reset and the process is repeated.

7 Claims, 1 Drawing Sheet

5,486,750

BATTERY CHARGER WITH POLARITY SENSING AND TIMER

There are a large number of throwaway 9-volt batteries used in the medical and communications field. For example, in medicine many monitors utilize a portable transmitter to permit the patient to move about. These monitors operate on a continuous basis and may require a replacement battery every 12 hours. As such, a considerable number of batteries are consumed. There is an effort to employ rechargeable batteries and related chargers to reduce the cost of operating the monitors. Provided the batteries are correctly charged, such batteries should be rechargeable for at least one year and potentially up to two years. The charging and replacement of the battery is the responsibility of the medical staff who require a reliable, easily-operated charge system that requires a minimum of supervision. Most available chargers employ mechanical polarity correct connectors that are easily damaged or destroyed. A simpler pin type of connector is more robust and easier to use but does not identify visually the polarity of the connections. Accordingly, if the user inserts the battery in the reverse polarity, damage and/or destruction may occur to both the battery and the charger.

Various proposals have been made to avoid battery damage by incorrect connection to the charger. U.S. Pat. No. 5,103,155 to Joannou discloses a cable system for use in an automobile. In this arrangement, the relative polarity of the charge cables is sensed by a pair of operational amplifiers and an appropriate connection made between pairs of cables by a relay. Such an arrangement, however, is not suitable for smaller batteries as are typically used in the medical and telecommunications industries.

In an article published in the Canadian Medical and Biological Engineering Society Conference Proceedings, 8th–11th Jun., 1992, entitled "An Innovative Battery Charger for Telemetry Systems", there is disclosed a charger which supports placement of a battery into the charger in either polarity position. In this arrangement, an operational amplifier is used to switch the polarity of a charge current by monitoring the charge current at one input against a reference input. While this arrangement has operated successfully and avoids battery damage through incorrect battery connection, it does not ensure that a battery is fully charged before removal and also permits the battery to be discharged through the charging resistor if the power supply is inadvertently switched off with the battery in place. In either case, a battery with an incomplete charge may be provided inadvertently.

Other techniques for protecting against wrong connection include U.S. Pat. No. 3,609,506 which protects the charger with a fuse that blows on an incorrect connection; U.S. Pat. No. 4,571,533 which signals an improper connection but does not reverse it; and U.S. Pat. No. 4,868,706 which turns off the charger if it is wrongly connected. None of these devices, however, are suitable for a medical or telecommunications environment where frequent battery charges and a reliable source of fully charged batteries is essential.

It is an object of the present invention to provide a battery charger system that obviates or mitigates the above disadvantages. In general terms, the present invention provides a charger that automatically adjusts for correct polarity charging regardless of the polarity when the battery is inserted into the holder.

A battery charger comprising a pair of connectors for transferring charge to a battery, a charging circuit connected to said connectors and having a supply connected to one of said connectors, said supply being operable to connect either a +re or a −re voltage source to said connectors and switch means to connect one or other of sources, said switch means being responsive to output of a sensor that monitors current flow in said charging circuit.

It is preferred to isolate the charging circuit from the sensing circuit.

It is also preferred to charge the battery at a preset constant current rate and provide an indicator that charging is taking place. When the battery is fully charged, a different indicator is switched on and the charging indicator extinguished.

An embodiment of the invention will now be described by way of example only with reference to the accompanying drawing which is a schematic of an electronic circuit.

Referring therefore to the drawing, a battery charger 6 includes a polarity sensing and charge circuit generally indicated at 8 and having an operational amplifier 10. The operational amplifier 10 has its output 12 connected to a pair of current-directing diodes (14,16) through a current-limiting resistor 18. The cathode 20 of diode 14 is connected to the anode of an LED 22 of an opto isolator 24. Similarly, the anode 26 of diode 16 is connected to the cathode of the LED 28 of an opto isolator 30.

A power supply 32 provides a positive and negative 20 volt output 34,36. The +20 volt output is connected to the collector 38 of opto isolator 24 and the −20 volt output 36 is connected to the emitter 40 of opto isolator 30. The emitter 42 of opto isolator 24 is connected to the collector 44 of opto isolator 30.

The common connection of the emitter 42 and collector 44, indicated at 45, is connected to two reference diodes 48,50, one terminal 52 of analog switch 54 and the non-inverting input 56 of the operational amplifier 10.

The common connection point 45 of the output of opto isolators 24,30 is also connected to one terminal connector 58 to which one terminal of a battery, indicated in ghosted outline at 61, will be connected. A second terminal connector 60 to which the other terminal of the battery to be charged to be connected is connected to one junction 62 of a current-directing bridge 64. The bridge 64 directs the current correctly through a charge indicator 66 connected across the apexes 68,70 of the bridge 64 regardless of polarity connection of the battery 61.

The bridge junction 72 opposite to the junction 62 is connected to the constant current resistor 74 and the inverting input 76 of the operational amplifier 10.

A charge timing circuit 80 is connected across the apexes 68,70 with apex 68 connected to the positive side 82 of capacitor 84 and to one end of resistor 86. The opposite side 88 of capacitor 84 is connected to other end of resistor 86 and through an opto isolator 90 to the apex 70 of the current-directing bridge 64.

A +5 volt power supply is connected to the collector 92 of opto isolator 90 and the emitter 94 of opto isolator 90 is connected to the reset pin 96 of a programmable timer 98. A clock input 100 is connected to input pin 102 of the timer 98.

The output 104 of the timer 98 is connected to the control input 106 of analog switch 54 and to a control input 108 of a second analog switch 110. The analog switch 110 controls current to the green finish charge LED 112 so that it is illuminated when the switch is closed. The analog switch 54 controls current supply to the non-inverting input 56 of op amp 10 to connect it to ground when the switch is closed.

In operation, when DC power is applied from the supply 32, the output 12 of op amp 10 will randomly drive positive or negative. As a starting point, assume the output 12 is positive and that there is no battery connected to the circuit at connectors 58,60.

The positive output 12 of op amp 10 drives diode 14 and the opto isolator 24 to full on characteristics. With opto isolator 24 full on, 18+ volts is supplied to connector 58 and current is limited through resistor 46 to diodes 48,50. The diode 48 will not conduct since it is reversed biased relative to the voltage at common connection 45 but diode 50 will conduct the current limit of resistor 46. Diode 50 supplies a reference voltage of approximately 0.63 volts to the non-inverting input 56 of op amp 10. Since there is no current through resistor 74 due to the open connection at connectors 58,60, inverting input 76 is at 0 voltage and the op amp output 12 continues to drive at maximum voltage output.

When a battery is connected between connectors 58,60 and the positive terminal of the battery is connected to connector 58, the 18+ volts of the drive circuit will force current through the battery overcoming the opposed 7 to 9 volts of the battery 61. The current will pass through the current-directing bridge 64 and corresponding yellow LED 66 will be illuminated to indicate charging is taking place. The current from junction 12 of the bridge 64 passes to ground through resistor 74 to develop a voltage at the non-inverting input 76 of op amp 10.

When the current through resistor 74 is large enough to develop a voltage that is greater than the reference voltage on the non-inverting input 56 of the op amp 10, the output 12 of the op amp 10 will attempt to decrease its drive to maintain the voltage at the inverting input 76 equal to the non-inverting input 76 of op amp 10. This modulates the current supplied to the connection 45 until the voltage at inverting input 76 is equal to that at the non-inverting terminal 56. This now charges the battery at a current rate according to $$I = E/R = \frac{\text{reference voltage}}{\text{value of resistor 74}}.$$

This charge rate will be constant until terminated by the timing circuit, as will be discussed below.

Another condition exists when the battery is connected opposite to the condition. If the battery is connected so that the negative terminal of the battery 61 is connected to connector 58, the battery voltage is not in opposition to the applied voltage through opto isolator 24. As the current continues through the bridge 64 and resistor 74 to ground, the voltage at the inverting input 76 of op amp 10 increases to match the voltage on the non-inverting input 56, consequently decreasing the output voltage as before.

However, the battery is connected in such a polarity as to continue to drive current from the battery through resistor 74, resulting in an increase in positive polarity voltage to inverting input 76 of op amp 10. This increase in voltage causes the output 12 of op amp 10 to flip to a negative voltage output. It is the design characteristic of an op amp 10 to maintain the voltage difference between its inverting input 76 and its non-inverting input 56 at a minimum.

Since the output 12 of the op amp 10 now drives negative, the positive voltage opto isolator 24 is switched off and negative voltage opto isolator 30 switched on to drive the circuit. The battery is now in voltage opposed connection and is charged with reverse current flow using the same logic that was applied to the positive current flow circuit.

The battery is now charged with constant current flow until the timer terminates the cycle.

The timing cycle is initiated when current flows through LED 66 in the bridge 64. This may be when the power is initially connected if a battery has previously been installed or when a battery is connected across the connectors 58,60. The voltage developed across LED 66 is AC coupled via capacitor 84 and resistor 86 to opto isolator 90 turning on the opto isolator 90 for a short duration. This causes the timer reset 96 to go high and drop to 0 volts. This momentary spike of voltage resets the timer 98 and starts the selected timing period. Every time a battery is connected, a reset pulse is generated and the timing out period is started. At the end of the timing out period, the output 104 of the timer 98 goes high and turns on or closes analog switches 54 and 110.

Analog switch 110 allows current to flow through the green LED 112 indicating the charge cycle is finished. Analog switch 54 conducts and drops the reference voltage applied to input 56 to approximately 25 millivolts and consequently, by operation of op amp 10, decreases the charge current to approximately 0.5 milliamps as a trickle charge.

The provision of the opto isolators 24,30 permits reversal of charging current and also acts to isolate the op amp 10 from the battery so that the op amp output stage cannot be internally biased to an on position. This prevents the battery from completing the circuit and consequently discharging itself through the current charging resistor if the power supply is disconnected and the battery left in place.

By utilizing the timer 98, it is possible to indicate on an individual battery basis whether or not a battery has been subject to a complete recharging period and thereby avoid the use of a partially charged battery. This enhances the life of the battery by avoiding "short cycling" and also overcharging.

The op amps 10 may utilize a dual op-amp configuration that permits a duplicate circuit to be incorporated as another charging bay for the second battery.

We claim:

1. A battery charger comprising a charging circuit to charge a battery and a control circuit to control said charging circuit, said charging circuit having a pair of electrical contacts to be connected to a corresponding pair of terminals of the battery to be charged to transfer charge thereto and a power supply having a pair of sources of opposite polarity and each connected to a respective one of said pair of electrical contacts by a respective one of a pair of current switches, said control circuit including an operational amplifier having an input connected to said charging circuit and an output operable upon said switches and being operable to monitor charging current flowing in said charging circuit and operate one of said current switches to connect to said one of said contacts a source of the same polarity as that of the one of said battery terminal connected thereto, said control circuit maintaining said charging current in said charging circuit at a predetermined level and having a reference input applied to said amplifier, said reference input being connected to said one of said contacts to apply a reference voltage of the same polarity as said one of said sources to said reference input.

2. A battery charger according to claim 1 wherein said switches are opto isolators and said output is operable to activate one of said isolators.

3. A battery charger according to claim 1 wherein the polarity of voltage at said output of said operational amplifier inverts to maintain voltage at said input at the same magnitude as said reference voltage and thereby operates the other of said swatches to connect the other of said sources to said contact.

4. A battery charger comprising a charging circuit to charge a battery and a control circuit to control said charging circuit, said charging circuit having a pair of electrical contacts to be connected to a corresponding pair of terminals of the battery to be charged to transfer charge thereto and a power supply having a pair of sources of opposite polarity and each connected to a respective one of said pair of electrical contacts by a respective one of a pair of current switches, said control circuit monitoring current flowing in said charging circuit and operating one of said currant switches to connect to said one of said contacts one of said sources having the same polarity as that of the one of the battery terminals connected to said one of said contacts, said control circuit including a timer to maintain operation of said charging circuit for a predetermined period and an operational amplifier having a reference input, said control circuit maintaining charging current in said circuit at a predetermined level for said predetermined period and changing said reference voltage to reduce said charging current upon expiration of said predetermined period.

5. A battery charger comprising a charging circuit to charge a battery and a control circuit to control said charging circuit, said charging circuit having a pair of electrical contacts to be connected to a corresponding pair of terminals of the battery to be charged to transfer charge thereto and a power supply having a pair of sources of opposite polarity and each connected to a respective one of said pair of electrical contacts by a respective one of a pair of current switches, said control circuit monitoring current flowing in said charging circuit and operating one of said current switches to connect to one of said contacts one of said sources having the same polarity as that of the one of the battery terminals connected to said one of said contacts, said control circuit including a timer to maintain operation of said charging circuit for a predetermined period, initiation of said timer being controlled by an opto isolator responsive to initial current flow in said charging circuit upon connection of said battery to said one of said sources to start said timer.

6. A battery charger comprising a charging circuit to charge a battery and a control circuit to control said charging circuit, said charging circuit having a pair of electrical contacts to be connected to a corresponding pair of terminals of the battery to be charged to transfer charge thereto and a power supply having a pair of sources of opposite polarity and each connected to a respective one of said pair of electrical contacts by a respective one of a pair of current switches, said control circuit monitoring current flowing in said charging circuit and operating one of said current switches to connect to one of said contacts one of said sources having the same polarity as that of the one of the battery terminals connected to said one of said contacts, said control circuit including a timer to maintain operation of said charging circuit for a predetermined period, said timer being initiated by initial current flow in said charging circuit upon connection of said battery to said one of said sources and providing a signal upon expiration of said period, said control circuit further including an operational amplifier having an output connected to said switches, a reference input connected to said one of said contacts to apply a reference voltage thereto of the same polarity as said one of said sources and an inverting input connected to said charging circuit to provide an inverting voltage indicative of current flow in said charging circuit, said output modulating charging current from said sources to maintain said reference voltage and inverting voltage of the same magnitude.

7. A battery charger according to claim 6 wherein said reference voltage is reduced upon expiration of said predetermined period.

* * * * *